M. C. ROLLAND.
SLIDING JOINT OF FLUID PRESSURE APPARATUS.
APPLICATION FILED AUG. 7, 1917. RENEWED NOV. 12, 1919.
1,325,996.
Patented Dec. 23, 1919.
2 SHEETS—SHEET 1.
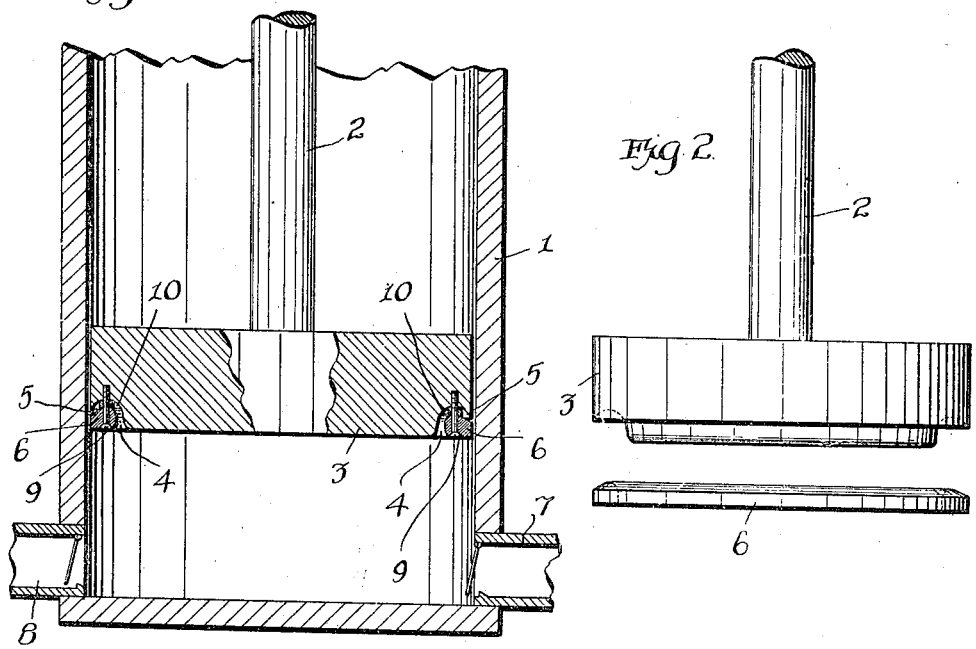
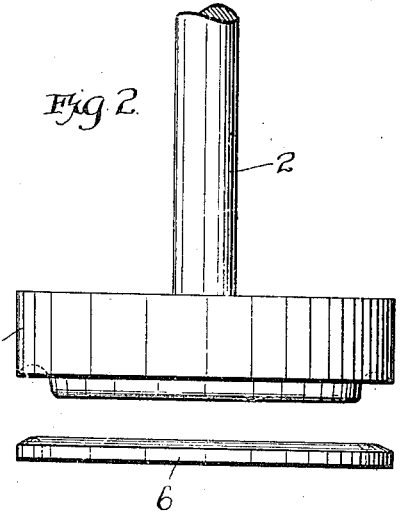
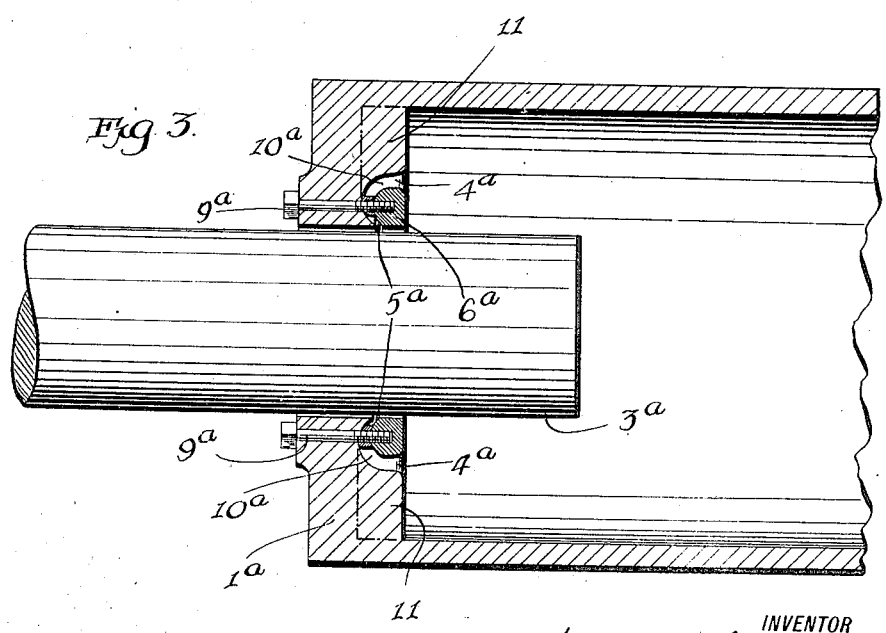
INVENTOR
Modeste C. Rolland
BY
ATTORNEY

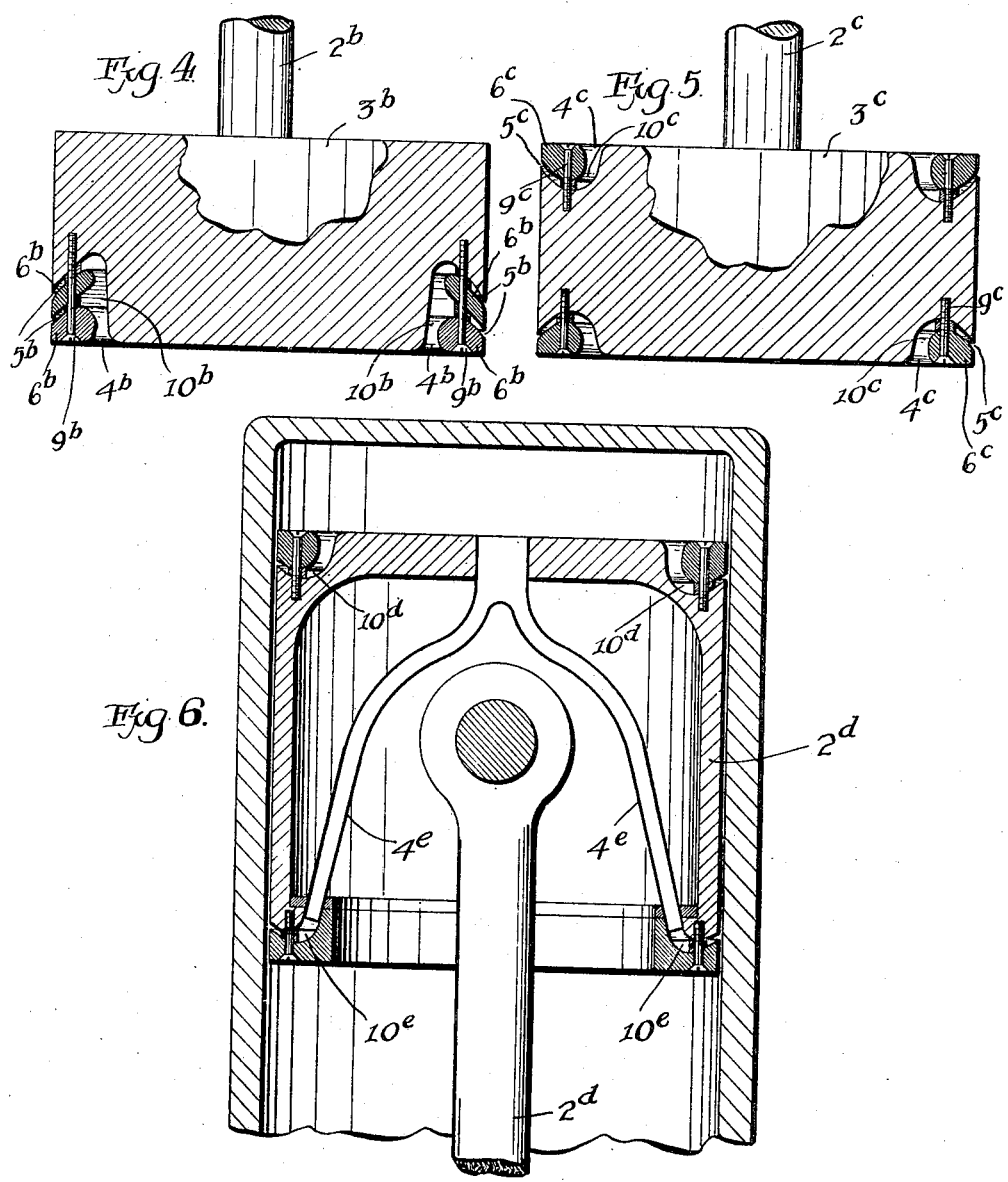

UNITED STATES PATENT OFFICE.

MODESTO C. ROLLAND, OF NEW YORK, N. Y.

SLIDING JOINT OF FLUID-PRESSURE APPARATUS.

1,325,996.     Specification of Letters Patent.     Patented Dec. 23, 1919.

Application filed August 7, 1917, Serial No. 184,812. Renewed November 12, 1919. Serial No. 337,626.

*To all whom it may concern:*

Be it known that I, MODESTO C. ROLLAND, a citizen of the Republic of Mexico, residing in the borough of Manhattan, city of New York, county of New York, and State of New York, have invented new and useful Improvements in Sliding Joints of Fluid-Pressure Apparatus, of which the following is a specification.

The invention relates to sliding joints of fluid pressure apparatus, and its object is substantially to eliminate friction between the parts in contact, still keeping the joint fluid tight. This is accomplished, without the use of mechanical packings, by providing one of the members of the joint with a passage which leads from the region of superior pressure and delivers around the side in a direction contrary to the pressure.

In the accompanying drawings illustrating schematically some of the applications of the invention:

Figure 1 is an axial section through a pump containing the invention;

Fig. 2 is an elevation of the parts of the piston slightly separated;

Fig. 3 is an axial section through the chamber of a plunger apparatus, the plunger being in elevation;

Fig. 4 is a longitudinal section of a piston showing a modification;

Fig. 5 is a longitudinal section of a piston having passages at both sides delivering in opposite directions away from each other; and Fig. 6 is a longitudinal section through a piston and cylinder showing still another construction.

In Fig. 1, the pump cylinder 1 has an inlet 7 and an outlet 8. The piston 3 secured to piston rod 2 is provided adjacent its pressure face with a passage 10 having its inlet 4 leading from the pressure face and an outlet 5 delivering around the side into the joint. The passage is suitably formed or recurved so that the outlet 5 delivers more or less longitudinally in a direction contrary to the pressure. This creates a counter-pressure or velocity in the joint which opposes the leakage of fluid lengthwise of the joint to the region of lower pressure. The outlet of the passage, it will be noted, is reduced relatively to the inlet.

The passage is advantageously formed through the provision of a ring 6, which is secured in a peripheral or corner recess in the piston by fastenings 9, in such manner as to leave an annular passage of the indicated character.

In Fig. 3 the invention is shown in connection with a hydraulic press or compressor or similar apparatus. Here the packing passage is formed in the end of the chamber $1^a$ through which the plunger $3^a$ passes. Similar parts are designated by the same reference numerals as in Fig. 1, with the super-character $a$. The portion 11 bounded by dotted lines may be omitted.

The piston of Fig. 4 differs from that of Figs. 1 and 2 in having double rings and passages, both passages leading from and delivering adjacent to the same pressure face and in the same direction. Parts are designated by the same numerals with super-character $b$.

Fig. 5 illustrates the fact that the self-packing may also be provided at the low or atmospheric pressure side, to prevent leakage on the suction stroke. Accordingly this piston has passages leading from both of its opposite faces and delivering into the joint adjacent to these faces and in opposite directions, away from each other. The super-character $c$ is used in this view.

Fig. 6 shows a construction which may be used for trunk pistons. The piston $2^d$ has a passage $10^d$ adjacent its working face, and another $10^e$ toward the opposite end. Others may be provided at intermediate points. All of these passages have their outlets similarly directed, and the lower passage $10^e$, that is to say the one nearer the crank-shaft, to which the piston is connected by rod $2^d$, is connected with the pressure region by inlet tubes $4^e$.

Numerous other applications and specific constructions are within the contemplation of the invention. It will be understood, of course, that the clearance between the joint members is greatly exaggerated in all the views.

What is claimed as new is:

1. A self-packing sliding joint for fluid pressure apparatus, one of the elements of which is provided with a circular passage leading from the region of superior pressure and recurved and narrowed so as to deliver a velocity stream backward into the joint in a direction contrary to the pressure.

2. A self-packing sliding joint for fluid pressure apparatus, one of the elements of which is formed with a circular edge recess and provided with a ring secured in said recess, the ring and recess being formed so as to afford a passage leading from the region of superior pressure and recurved and narrowed so as to deliver a velocity stream into the joint in the direction contrary to pressure.

In witness whereof I have hereunto set my hand this 26th day of July, 1917.

MODESTO C. ROLLAND.

Witnesses:
G. H. EMPEY,
F. V. SHEEHAN.